ature you have reached

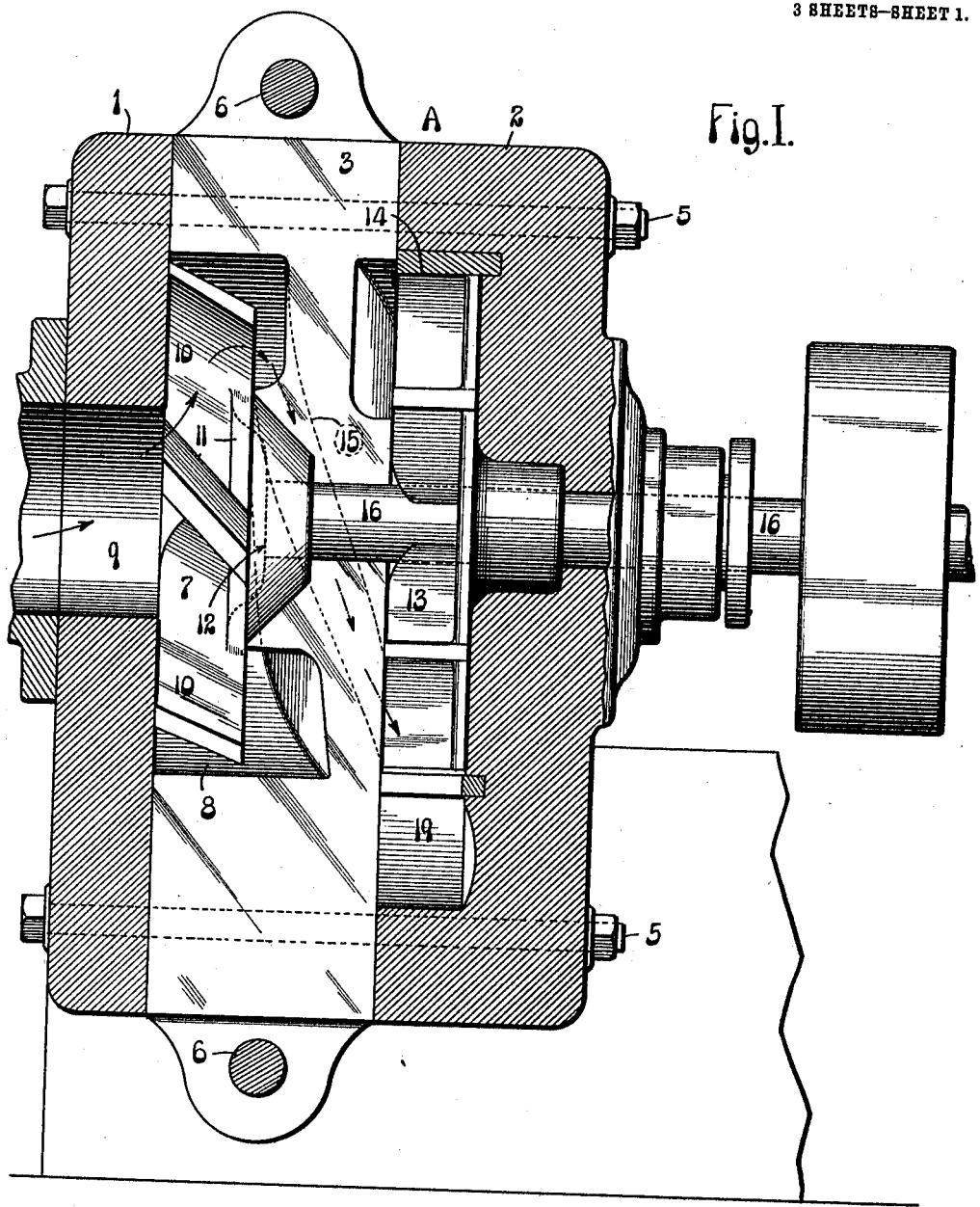

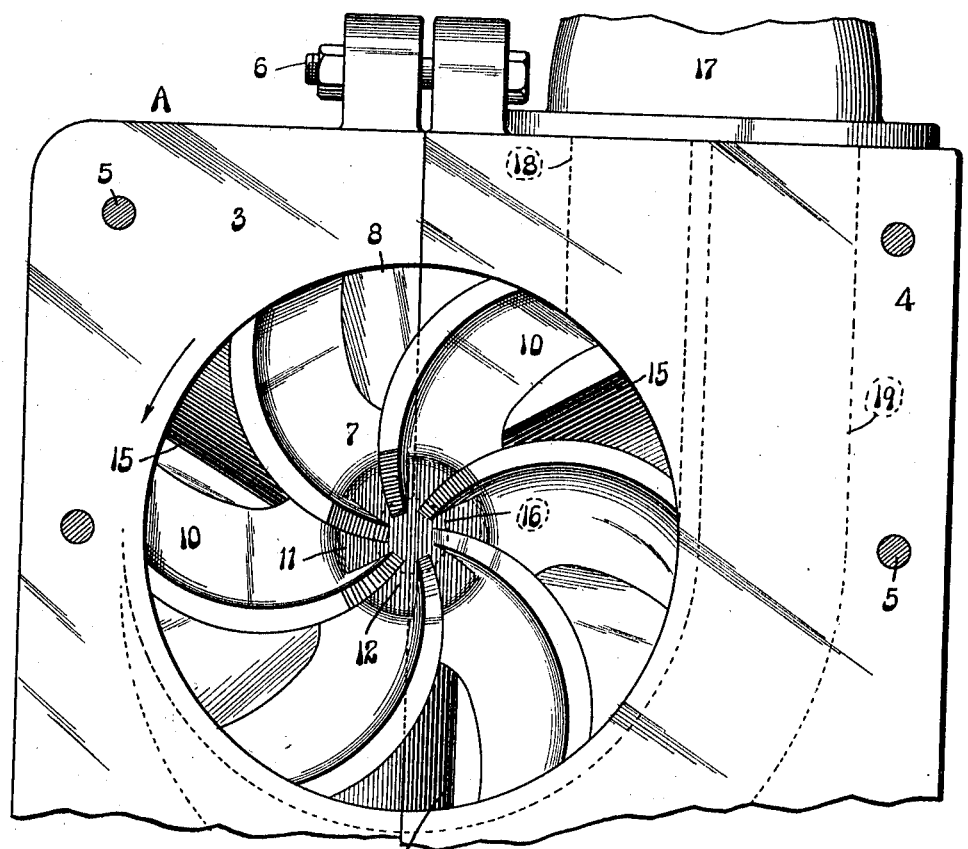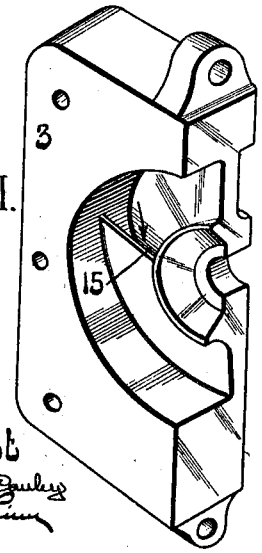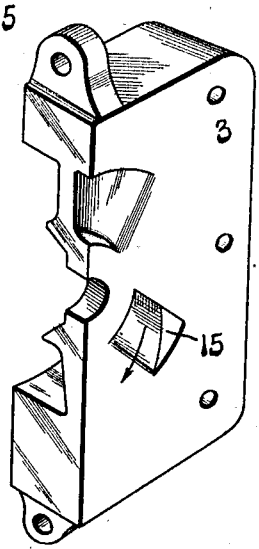

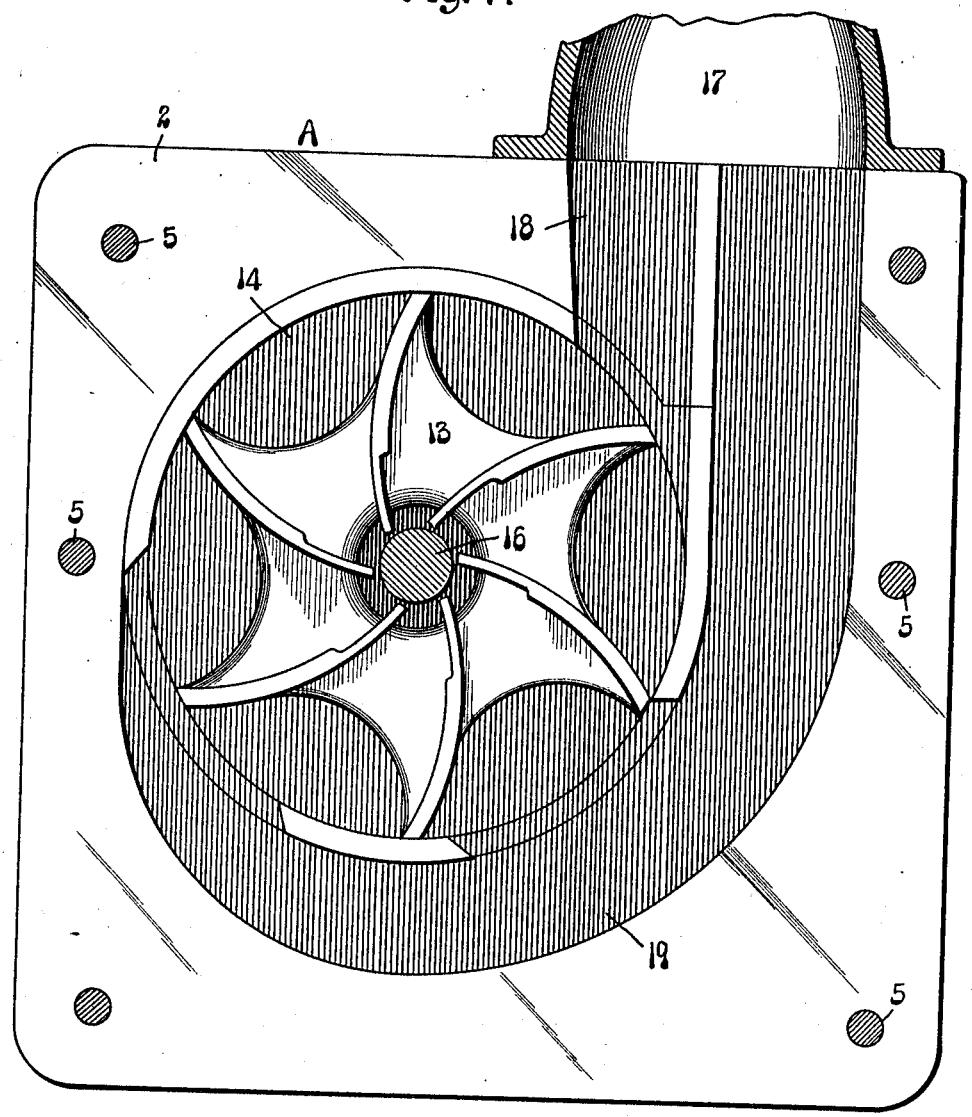

UNITED STATES PATENT OFFICE.

GEORGE W. WRIGHT, OF WEBB CITY, MISSOURI.

ROTARY IMPELLING-PUMP.

1,004,331.  Specification of Letters Patent.  Patented Sept. 26, 1911.

Application filed August 29, 1910. Serial No. 579,376.

*To all whom it may concern:*

Be it known that I, GEORGE W. WRIGHT, a citizen of the United States of America, residing at Webb City, in the county of Jasper and State of Missouri, have invented certain new and useful Improvements in Rotary Impelling-Pumps, of which the following is a full, clear, and exact description, reference being had to the accompanying drawings, forming part of this specification.

My invention relates to a rotary impelling pump, and has for its object the production of a pump of high efficiency, capable of operating against a very high head of water, and whereby a positive and continuous flow of water in large volume may be constantly maintained. Owing to the peculiar construction of my improved pump, it prevents the water from slipping or flowing backward and it has the efficiency of a gang of centrifugal pumps.

To provide for the attainment of the objects mentioned, the pump includes an intake impelling wheel and a discharge impelling wheel mounted upon a shaft common to both of them, arranged in a suitable housing, and separated from each other by a partition containing ducts or passageways extending diagonally relative to the axes of the wheels and so disposed within the housing that the fluid gathered by the intake impelling wheel will be discharged therefrom obliquely relative to said wheel toward the perimeter of the discharge impelling wheel. The intake impelling wheel is located adjacent to an inlet opening in the housing of the pump and its blades are inclined in cross section to provide for the forcing of fluid through the ducts or passageways just mentioned and, as a consequence, the fluid pressure acquired in the operation of my pump is not appreciably diminished or dissipated while the fluid is passing from the intake impelling wheel to the discharge impelling wheel and, furthermore, the fluid is discharged to the discharge impelling wheel in such manner as to permit of its being discharged from the latter at its periphery with a much smaller expenditure of power than would be required if the fluid were delivered to the discharge impelling wheel in alinement with its axis, or in any other manner than that in which it is delivered as provided for in my pump.

Figure I is a side elevation, partly in section, of a pump embodying the features of my invention. Fig. II is an end elevation, the housing section at the inlet end of the pump being removed. Fig. III is a perspective view of one of the partitions which form part of the pump housing. Fig. IV is a perspective view showing the rear face of the partition seen in Fig. III. Fig. V is an end elevation, partly in section, showing the parts at the discharge end of the pump.

In the accompanying drawings: A designates a pump housing comprising end sections 1 and 2 and intermediate sections 3 and 4, connected by bolts 5. The intermediate sections are separable transversely of the housing and connected by bolts 6.

7 designates an intake impelling wheel mounted in the chamber 8 within the intermediate sections 3 and 4 and 1. The intake wheel 7 is provided with impelling blades 10 curved longitudinally and inclined in cross section, and at the middle of said wheel is a central web 11 providing a pocket 12 that is located opposite the inlet opening 9 in the end section 1 of the housing A.

13 designates a discharge impelling wheel located in a chamber 14 which is partially within the end section 2 of the housing A, and partially within the intermediate sections 3 and 4.

16 designates a drive shaft, rotatably mounted in the end section 2 of the housing A and also rotatably mounted in the intermediate sections 3 and 4, the latter of which constitute a split bearing for said shaft. The drive shaft 16 carries the impelling wheels 7 and 13 fixed thereto and located in their respective chambers 8 and 14, the impelling wheels being separated by a partition furnished by the intermediate sections 3 and 4.

In the partition furnished by the intermediate sections 3 and 4 are ducts or passageways 15 providing communication between the chamber 8 and the chamber 14. These ducts extend diagonally through the partition relative to the axes of the impelling wheels and drive shaft 16 by which said impelling wheels are carried. As a consequence, fluid entering the housing of my pump through the inlet 9 is picked up by the inclined blades of the intake impelling wheel 7 and forced through the diagonally extending ducts 15 toward the blades of the discharge impelling wheel 13.

The chamber 14 in which the discharge impelling wheel 13 operates is in communication with two discharge passageways 18 and 19 extending at right angles to the axis of said discharge impelling wheel, and these passageways terminate at a conducting pipe 17 through which fluid is forced as it is discharged from the chamber 14 by the discharge impelling pump.

The fluid forced through the diagonally arranged ducts 15 by the intake impelling wheel, enters the chamber 14 in such courses as to move toward the periphery of the discharge impelling wheel therein and, therefore, during the rotation of the discharge impelling wheel, it is enabled to force the fluid from the chamber 14 into the discharge passageways at right angles to the axis of the discharge impelling wheel with a minimum expenditure of power compared with the power that would be required to force the fluid into the conducting pipe in any rotary impelling wheel pump structure which did not contemplate delivery of fluid to the discharge impelling wheel in such manner as to provide for the fluid moving toward the perimeter of the discharge impelling wheel, in order that it might most easily be forced into and through a conducting pipe leading from the pump housing.

I claim:—

1. A pump of the character described, comprising a housing construted with an inlet opening at one of its ends, an intake chamber, a discharge chamber, a stationary partition separating the intake and discharge chambers, and having diagonal passageways extending from the intake chamber to the discharge chamber, the housing being provided with a discharge passage leading from the discharge chamber, a drive shaft extending through the discharge chamber, the partition and the intake chamber, an intake impelling wheel fixed to the shaft and located wholly within the intake chamber, and a discharge impelling wheel fixed to the shaft and located wholly within the discharge chamber.

2. A pump of the character described, comprising a housing consisting of end sections and a separable partition interposed between said end sections, one of the end sections being provided with a central inlet opening, a rotatable intake impelling wheel opposite said inlet opening and housed in part by said end section and in part by said partition, said partition having ports which form passageways for fluid discharged from said impelling wheel, the other end section having a discharge opening, a discharge impelling wheel housed in part by said partition and in part by the last named end section, and a rotatable shaft interposed between the adjacent edges of the separable partition members and connecting said impelling wheels, said shaft being surrounded by only one of the end sections, the separable partition members constituting a split bearing for supporting said shaft at its inner end.

3. A pump of the character described, comprising a housing provided with inlet and discharge openings, rotatable impelling wheels mounted in said housing, one of said wheels being located adjacent to the inlet opening and provided with blades which are curved longitudinally and inclined in cross section so as to discharge fluid at an angle, the inner ends of said blades being spaced apart, said wheel having a central web integrally connected to the inner ends of said blades and forming a pocket for the reception of fluid passing through the inlet opening, the other impelling wheel being adjacent to the discharge opening, a partition interposed between said wheels, said partition having ports for allowing fluid to pass from the impelling wheel at the inlet opening to the impelling wheel at the discharge opening, and said ports being inclined in a direction corresponding to the angle at which fluid is discharged from the wheel at the inlet opening.

GEORGE W. WRIGHT.

In the presence of—
M. C. HAMMON,
E. B. LINN.

Copies of this patent may be obtained for five cents each, by addressing the "Commissioner of Patents, Washington, D. C."

Correction in Letters Patent No. 1,004,331.

It is hereby certified that in Letters Patent No. 1,004,331, granted September 26, 1911, upon the application of George W. Wright, of Webb City, Missouri, for an improvement in "Rotary Impelling-Pumps" an error appears in the printed specification requiring correction as follows: Page 2, line 43, after the word "and" insert the word *to;* and that the proper corrections have been made in the files and records of this office and are hereby made in the said Letters Patent.

Signed and sealed this 31st day of October, A. D., 1911.

[SEAL.]

E. B. MOORE,
*Commissioner of Patents.*